United States Patent

[11] 3,611,411

[72] Inventors Stephen L. Moshier
Cambridge;
Allan K. McCombs, Arlington; Stanley R. Rich, Worcester, all of Mass.
[21] Appl. No. 872,102
[22] Filed Oct. 29, 1969
[45] Patented Oct. 5, 1971
[73] Assignee Listening, Incorporated
Arlington, Mass.

[54] SPECTRUM-ANALYZING RECORDER
7 Claims, 1 Drawing Fig.

[52] U.S. Cl. .................................... 346/35,
346/74 E, 324/77 E, 179/1
[51] Int. Cl. .................................... G01r 23/18,
G01d 5/243
[50] Field of Search .......................... 346/33 R,
35, 74 E, 74 S, 74 SB, 74 SC, 74 CH; 324/77 D, 77 E, 77 F; 179/1 SA

[56] References Cited
UNITED STATES PATENTS
2,890,091   6/1959   Curtis .......................... 346/35
3,277,245   10/1966  Sponga ........................ 346/35 X Primary Examiner—Joseph W. Hartary
Attorney—Kenway, Jenney and Hildreth ABSTRACT: The spectrum-analyzing apparatus disclosed herein operates to generate a line or bar graph in which the length of each line represents the amplitude of a respective spectral component of a given input signal. A plurality of signal-holding circuits are employed each of which provides a continuing signal which is a function of the time-varying amplitude of a respective filter channel output signal. The various graph lines are generated starting simultaneously and, at the same time, a ramp generator is triggered to generate a ramp voltage. Each of the held or continuing signals is compared with the ramp voltage and, when the ramp voltage passes each continuing signal, a respective one of the lines is terminated.

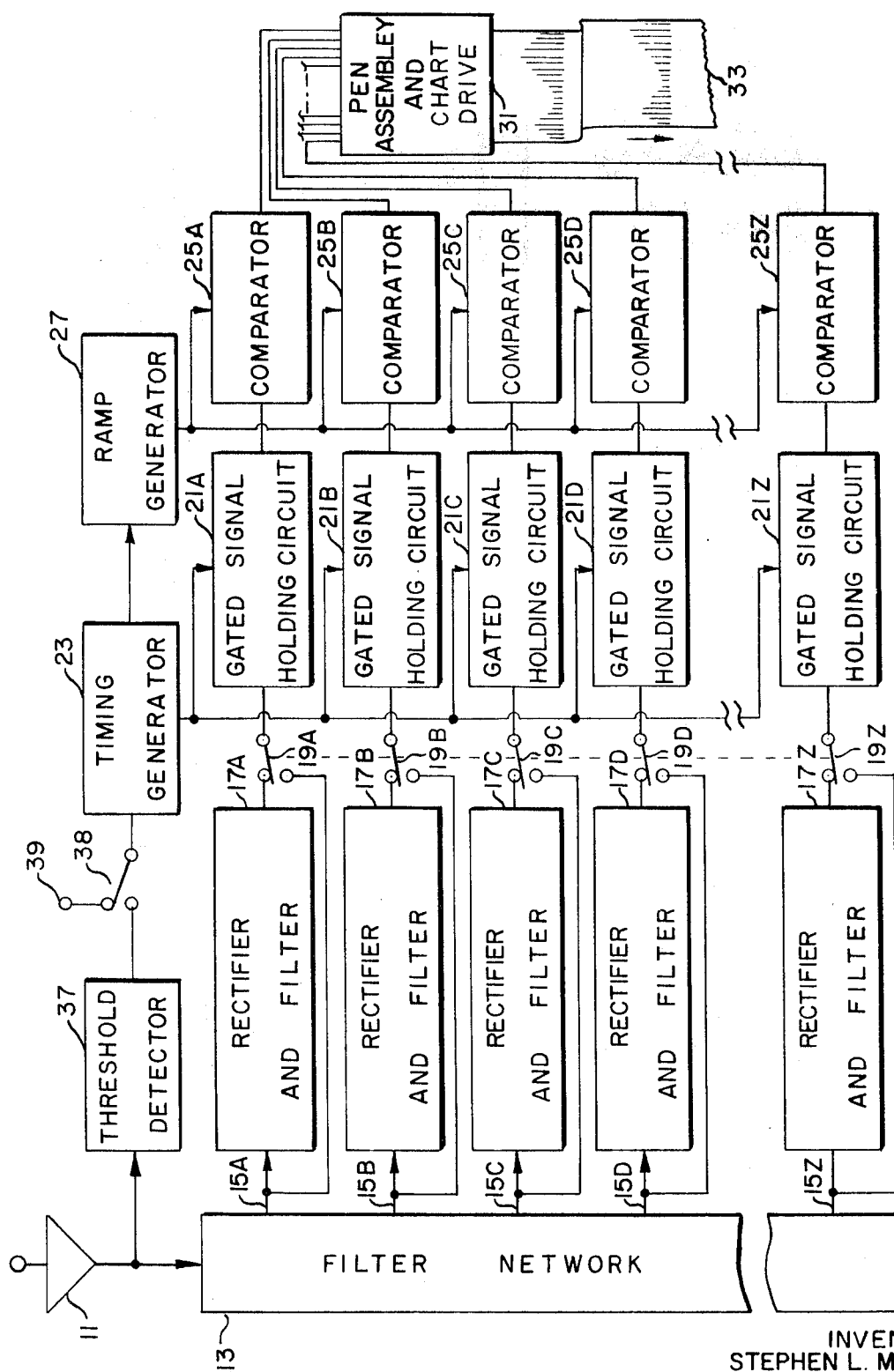

SPECTRUM-ANALYZING RECORDER

BACKGROUND OF THE INVENTION

This invention relates to spectrum-analyzing apparatus and more particularly to such apparatus which provides a visual display representing the spectral content of a given input signal.

Various spectrum-analyzing devices have been proposed heretofore for providing a visual display representing energy distribution as a function of frequency. Typically, however, the displays generated have either been transitory, e.g. appearing as an oscilloscope trace, or have been generated by measuring one spectrum component at a time. In many applications, it is desirable to provide a permanent record. However, when the spectral content or amplitude of a given input signal is rapidly changing, the display obtained by measuring the different components sequentially is not truly representative of the spectral content of the input signal at any given time. Further, apparatus operating in such a scanning mode is not useful when impulse signals, i.e. signals which do not continue for any appreciable length of time, are to be investigated.

Among the several objects of the present invention may be noted the provision of spectrum-analyzing apparatus which will provide a visual display representing the spectral content of a given input signal; the provision of such apparatus which measures a plurality of spectral components simultaneously; the provision of such apparatus which will measure and display the spectral content of an impulse signal; the provision of such apparatus which provides a permanent record of spectral content; the provision of such apparatus in which the various spectral elements are displayed substantially simultaneously; the provision of such apparatus which is highly reliable and which is relatively simple and inexpensive.

Other objects and features will be in part apparent and in part pointed out hereinafter.

SUMMARY OF THE INVENTION

Briefly, spectrum-analyzing apparatus according to this invention is operative to provide a visual display which represents the spectral content of a given input signal. The apparatus employs filter means having a plurality of output channels, each providing an output signal having an amplitude which varies as a function of a respective spectral component of the input signal. The apparatus also includes a corresponding plurality of independently controllable writing means, one for each channel, for generating visible lines on a moving record. A plurality of signal-holding circuits provide continuing signals having amplitudes which are functions of the time-varying amplitudes of the respective output signals. The held signals are compared, in respective comparator circuits, with a time varying ramp voltage. All of the writing means are controlled to start generating the respective lines substantially simultaneously with the initiation of the ramp voltage. The generation of each lime is terminated under the control of the respective comparator circuit when the amplitude of the ramp voltage passes the amplitude of the respective continuing signal provided by the respective holding circuit.

BRIEF DESCRIPTION OF THE DRAWING

The single FIGURE is a block diagram of spectrum-analyzing apparatus according to the present invention.

DESCRIPTION OF THE PREFERRED EMBODIMENT

Referring now to the drawing, an input signal to be analyzed is applied, through a suitable input amplifier 11, to a multichannel filter network 13. Filter network 13 may, for example, comprise a plurality of individual filters each of which operates to pass only a respective spectrum component of the input signal. Filter network 13 thus provides at a plurality of output channels or leads 15A–15Z, a plurality of output signals each of which has an amplitude which varies as a function of a respective spectral component of the input signal.

Each of the output signals is applied to a rectifier and filter network, 17A–17Z respectively. Each network 17A–17Z operates to provide a signal having a DC amplitude which is a function of or is substantially proportional to the AC amplitude of the direct output signal. Hereinafter, the signals provided by the networks 17A–17Z are referred to as amplitude signals.

A plurality of two-position switches 19A–19Z are provided for selecting between the direct output signals and the amplitude signals. The signal selected by each of the switches 19A–19Z is applied to a respective gated signal-holding circuit 21A–21Z. Each of these circuits can operate as either a conventional sample-and-hold circuit or as a peak-detecting circuit, depending upon the particular mode of operation desired of the overall apparatus. As will be readily understood by those skilled in the art, the circuitry typically provided to perform a conventional sample-and-hold operation can be easily adapted to perform a peak detection or pulse-stretching operation and may, in fact, provide such an operation inherently if a long sampling period is provided. Thus, in the present apparatus, peak detection and sample-and-hold functions are preferably provided by the same circuit components and, in the drawing, these components are represented as a single block element. In either case, each holding circuit 21A–21Z operates to provide a continuing signal having an amplitude which is a function of the time varying amplitude of the input signal applied thereto.

The holding circuits 21A–21Z are controlled by a programmer or timing generator, designated 23. When the holding circuits are functioning as sample-and-hold devices, each provides a continuing output signal which is equal to the instantaneous amplitude of the respective input signal at the time the respective holding circuit is gated by the timing generator 23. When the holding circuits are operating as peak detectors, each operates to provide an output signal having an amplitude which is proportional to the peak amplitude of the input signal applied thereto during an interval controlled by the timing generator.

The continuing output signal provided by each holding circuit 21A–21Z is applied to one input of a respective comparator circuit 25A–25Z. A ramp generator 27 is provided for generating a rising ramp voltage or signal when triggered and this ramp voltage is applied to the other input terminal of each of the comparators.

A pen assembly and chart drive 31 is provided for generating a permanent record corresponding to the output signals of the comparators 25A–25Z. In the preferred embodiment of this apparatus illustrated, the record is generated on a moving strip of electrosensitive paper 33 and the assembly 31 comprises a plurality of individual contacts or pens (not individually shown) which engage the strip 33. As is understood by those skilled in the art, various types of electrosensitive paper are known in which the paper can be caused to darken by the application of current through a suitable pen. The output signals from the comparators 25A–25Z are applied to respective ones of the pens so that each pen will generate a line on the moving strip 33 when the continuing or held signal applied to the respective comparator is greater than the instantaneous value of the signal provided by the ramp generator 27.

Ramp generator 27 is also controlled by the timing generator 23. Ramp generator 27 is preferably arranged, as is understood by those skilled in the art, so that it normally provides a relatively high output voltage in its quiescent state but, when triggered, provides an output voltage which drops abruptly to a low value and then rises according to a predetermined time function back to the initial high level.

A threshold detector circuit 37 is provided for generating a trigger signal whenever the amplitude of the input signal applied to the filter network 13 exceeds a predetermined level or threshold. A switch 38 permits a cycle of operation of the timing generator 23 to be initiated either by the threshold detector 37 or by a suitable control signal, applied to a terminal 39. If desired, filtering or other signal-conditioning circuitry may be employed to affect the type of signal which will initiate operation of the timing generator. As an alternative, the timing generator may be triggered in response to a selected one of the filter output signals.

When continuing input signals are available, e.g. as is typically the case in the vibration analysis of rotating machinery, the apparatus illustrated can be operated to provide repetitive displays, substantially in the following manner. The switches 19A–19Z and switch 38 are positioned as shown in the drawing and a suitable control signal is applied to the terminal 39 at the desired display repetition rate. The input signal to be analyzed, e.g. obtained by means of a suitable microphone or acoustic pickup, is applied to the input terminal of the amplifier 11. The rectifier and filter circuits 17A–17Z will thus provide to the holding circuits 21A–21Z respective signals which are substantially proportional to the AC amplitudes of the respective spectral components of the input signal.

In this mode of operation, the signal-holding circuits 21A–21Z are operated as sample-and-hold circuits. When the timing generator circuit 23 is triggered by the repetitive control signal, each holding circuit 21A–21Z is gated on for a period which is long enough for it to acquire the value of the respective amplitude signal at that moment. After gating the holding circuits, the timing generator 23 triggers the ramp generator 27. When the ramp generator 27 is triggered, its output signal substantially instantaneously drops to a level corresponding to zero amplitude. Thus, assuming that each channel has a finite output signal, all of the pens in the assembly 31 will start to generate a respective line or bar on the strip 33 of electrosensitive paper, substantially simultaneously.

The various held signals provided by the circuits 21A–21Z will typically be at various different levels corresponding to spectral content of the input signal when the sample-and-hold circuits were triggered. As the ramp voltage provided by generator 27 reaches or passes each of these levels, the respective comparator circuit 25A–25Z will, in effect, turn off the respective pen, thereby terminating the generation of the respective line on the strip chart 33. The length of each lime in the chart will thus depend upon the amplitude of the held signal.

If the ramp voltage provided by generator 27 varies as a linear function of time, the length of each line will be substantially proportional to the amplitude of the respective spectral component. However, for various applications other ramp voltage functions may be used to provide various forms of display. For example, the ramp voltage may vary as an exponential function so that a logarithmic display is obtained.

When the apparatus is to be used for displaying the spectral content of signals of the impulse type, the switches 19A–19Z and the switch 38 are thrown to the positions opposite those shown in the drawing. When an impulse-type signal is then applied by the amplifier 11 to the filter network 13 and the threshold detector 37, the threshold detector triggers the timing generator 23. The timing generator in turn opens or gates the signal-holding circuits 21A–21Z for a predetermine period so that, during this period, the holding circuits are responsive to input signals applied thereto.

When the apparatus is being used with impulse-type signals, the holding circuits 21A–21Z are operated as peak detectors. Thus, as the various spectral components of the impulse signal are separated out by the filter network 13, the peak value of each output signal will determine the value of the continuing or held signal provided by the respective holding circuit, 21A–21F. At the end of the predetermined sampling or accepting period, the timing generator triggers the ramp generator 27. As in the operation described previously, the held signals are compared with the ramp voltage in respective comparators 25A–25Z. Thus, each spectral component causes the respective pen in assembly 31 to generate a line whose length is a function of the value of the respective continuing or held signal. The length of each line is thus also a function of the amplitude of the respective spectral component in the input signal, even though the input signal is itself of the impulse type.

In view of the forgoing, it may be seen that several objects of the present invention are achieved and other advantageous results have been attained.

As various changes could be made in the above construction without departing from the scope of the invention, it should be understood that all matter contained in the above description or shown in the accompanying drawings shall be interpreted as illustrative and not in a limiting sense.

What is claimed is:

1. Spectrum-analyzing apparatus for providing a visual display representing the spectral content of a given input signal, said apparatus comprising:
    filter means having a plurality of output channels each of which provides an output signal having an amplitude which varies as a function of a respective spectral component of said input signal;
    a plurality of independently controllable writing means, one for each of said channels, for generating a visible line on a record;
    a plurality of signal-holding circuits, one for each channel, each of which is operative to provide a continuing signal having an amplitude which is a function of the time-varying amplitude of the output signal from the respective filter channel;
    a ramp generator;
    a plurality of comparators, one for each channel, each comparator having a pair of input terminals one of which is connected to said ramp generator and the other of which is connected to the respective signal-holding circuit;
    means for initiating the generation of lines by all of said writing means at a preselected time and for substantially simultaneously initiating the generation of a ramp voltage by said ramp generator; and
    a respective means controlled by each comparator for terminating the generation of the respective line when the amplitude of the ramp voltage passes the amplitude of the continuing signal provided by the respective holding circuit.

2. Apparatus as set forth in claim 1 including a plurality of rectifier and filter circuits, one for each channel, for providing DC signals having amplitudes which are a function of the AC amplitudes of the respective filter output signals.

3. Apparatus as set forth in claim 1 wherein said holding circuits provide continuing signals having amplitudes which are a function of the peak amplitudes of the respective filter output signals.

4. Apparatus as set forth in claim 3 including means for initiating the generation of lines and said ramp voltage in response to the application of an impulse signal to said filter means.

5. Apparatus as set forth in claim 1 wherein said writing means includes a plurality of conductive pens for writing on a moving strip of electrosensitive paper, each comparator providing an output signal for energizing a respective one of said pens.

6. Spectrum-analyzing apparatus for providing a visual display representing the spectral content of a given impulse input signal, said apparatus comprising:
    filter means having a plurality of output channels each of which provides an output signal having an amplitude which varies as a function of a respective spectral component of said input signal;
    a plurality of independently controllable writing means, one for each of said channels, for generating a visible line on a moving record;
    a plurality of signal-holding circuits, one for each channel, each of which is operative to provide a continuing signal having an amplitude which is a function of the peak amplitude of the output signal from the respective filter channel;

a ramp generator;

a plurality of comparators, one for each channel, each comparator having a pair of input terminals one of which is connected to said ramp generator and the other of which is connected to the respective signal-holding circuit;

means for initiating the generation of lines by all of said writing means and initiating the generation of a ramp voltage by said ramp generator in response to the application of an impulse signal to said filter means; and a respective means controlled by each comparator for terminating the generation of the respective line when the amplitude of the ramp voltage passes the amplitude of the continuing signal provided by the respective holding circuit.

7. Spectrum-analyzing apparatus for providing a visual display representing the spectral content of a given input signal, said apparatus comprising:

filter means having a plurality of output channels each of which provides an output signal having an amplitude which varies as a function of a respective spectral component of said input signal;

a plurality of independently controllable writing means, one for each of said channels, for generating a visible line on a moving record;

a plurality of rectifier and filter circuits, one for each channel, for providing signals having DC amplitudes which are substantially proportional to the AC amplitudes of the output signals from respective filter channels;

a plurality of signal sample-and-hold circuits, one for each channel, each of which is operative to provide a continuing signal having an amplitude which is a function of the value of the respective amplitude signal at the time of sampling;

a ramp generator;

a plurality of comparators, one for each channel, each comparator having a pair of input terminals one of which is connected to said ramp generator and the other of which is connected to the respective sample-and-hold circuit;

means for initiating sampling of said sample-and-hold circuits at a preselected time and thereafter initiating the generation of lines by all of said writing means and, substantially simultaneously, initiating the generation of a ramp voltage by said ramp generator; and a respective means controlled by each comparator for terminating the generation of the respective line when the amplitude of the ramp voltage passes the amplitude of the continuing signal provided by the respective sample-and-hold circuit.